(12) United States Patent
Zhai et al.

(10) Patent No.: US 10,860,514 B2
(45) Date of Patent: Dec. 8, 2020

(54) INPUT/OUTPUT CARD FOR USE IN STORAGE DEVICE AND STORAGE DEVICE

(71) Applicant: EMC IP Holding Company LLC, Hopkinton, MA (US)

(72) Inventors: Haifang Zhai, Shanghai (CN); Jing Chen, Epping (AU); Yujie Zhou, Shanghai (CN); Hendry Xiaoping Wu, Shanghai (CN); David Wei Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/623,677

(22) Filed: Jun. 15, 2017

(65) Prior Publication Data
US 2017/0364467 A1    Dec. 21, 2017

(30) Foreign Application Priority Data

Jun. 16, 2016  (CN) .......................... 2016 1 0431738

(51) Int. Cl.
| | | |
|---|---|---|
| *G06F 13/40* | (2006.01) | |
| *G06F 1/18* | (2006.01) | |
| *G06F 13/42* | (2006.01) | |
| *G11B 33/12* | (2006.01) | |

(52) U.S. Cl.
CPC .......... *G06F 13/4068* (2013.01); *G06F 1/186* (2013.01); *G06F 13/4022* (2013.01); *G06F 13/4282* (2013.01); *G11B 33/126* (2013.01)

(58) Field of Classification Search
None
See application file for complete search history.

(56) References Cited

U.S. PATENT DOCUMENTS

| | | | |
|---|---|---|---|
| 5,334,046 A | 8/1994 | Brouillette et al. | |
| 7,216,188 B2 | 5/2007 | Reid et al. | |
| 7,502,669 B1 | 3/2009 | Evans et al. | |
| 7,809,964 B1 | 10/2010 | Strickland et al. | |
| 8,260,974 B1 | 9/2012 | Fredette et al. | |
| 9,940,280 B1 | 4/2018 | O'Brien et al. | |
| 2001/0011314 A1* | 8/2001 | Gallagher | G06F 9/4406 710/302 |
| 2006/0134936 A1 | 6/2006 | Sullivan et al. | |
| 2007/0136504 A1* | 6/2007 | Wu | G06F 13/4081 710/302 |
| 2014/0129753 A1* | 5/2014 | Schuette | G06F 13/4068 710/301 |
| 2015/0052275 A1 | 2/2015 | Maroney et al. | |

FOREIGN PATENT DOCUMENTS

CN       101046780 A      10/2007

\* cited by examiner

*Primary Examiner* — Henry Tsai
*Assistant Examiner* — Aurangzeb Hassan
(74) *Attorney, Agent, or Firm* — BainwoodHuang

(57) ABSTRACT

Implementations of the subject matter described herein provide an input/output (I/O) card for storage device and a storage device. The I/O card and the disk drive for the storage device have the same form factor and comply with the same protocol, to enable the I/O card and the disk drive can be arranged at the same end of the storage device.

3 Claims, 6 Drawing Sheets

INPUT/OUTPUT CARD FOR USE IN STORAGE DEVICE AND STORAGE DEVICE

RELATED APPLICATIONS

This application claim priority from Chinese Patent Application Number CN201610431738.2, filed on Jun. 16, 2016 at the State Intellectual Property Office, China, titled "I/O CARD FOR STORAGE DEVICE AND STORAGE DEVICE" the contents of which is herein incorporated by reference in its entirety.

FIELD

Implementations of the subject matter described herein generally relate to the field of storage, and more specifically, to an input/output card for a storage device and a storage device.

BACKGROUND

In currently available storage devices, a disk drive typically has a form factor that is different from a form factor of the input/output (I/O) card and adopts different interface specification from that of the I/O card. For example, a general-purpose disk drive for storing user data generally has a size of 2.5 inches or 3.5 inches and is arranged at the front end of the storage device via a serial attached SCSI (SAS) interface for user access, while an I/O card typically has a form factor of a host bus adapter and is arranged at the rear end of the storage device via a peripheral component interface express (PCIe) interface.

SUMMARY

A first aspect of the subject matter described herein provides an input/output (I/O) card for use in a storage device. The I/O card and the disk drive for the storage device have the the same form factor and comply with the same protocol, to enable the I/O card and the disk drive can be arranged at the same end of the storage device.

A second aspect of the subject matter described herein provides a storage device. The storage device includes a processing unit, a switch connected to the processing unit via a first bus, a disk drive connected to the interface of the switch via a second bus, and an I/O card according to the first aspect of the subject matter described herein which is connected to the interface in the switch via the second bus. The disk drive and the I/O card are arranged at the same end of the storage device.

The I/O card according to the implementations of the subject matter described herein enables the I/O card and the disk drive to be arranged (for example, inserted) at the same end of the storage device for user access (or hot plug), which provides flexible configuration between the disk drive and the I/O card in the same storage device as well as flexibility of rack cable routing in the storage device.

It will be appreciated that the summary part does not intend to indicate essential or important features of the implementations of the subject matter described herein or to limit the scope of the subject matter described herein. Other features of the subject matter described herein will be easier to understand with the following depiction.

BRIEF DESCRIPTION OF THE DRAWINGS

Features and advantages of the subject matter described herein will be easier to understand by depicting example implementations of drawings. In the drawings.

In all the figures, identical or similar reference numbers represent the same or similar elements.

DETAILED DESCRIPTION

Principles of the subject matter described herein will now be described with reference to some example implementations. It should be appreciated that description of those implementations is merely to enable those skilled in the art to better understand and further implement example implementations disclosed herein and is not intended for limiting the scope disclosed herein in any manner.

As used herein, the term "includes" and its variants are to be read as open-ended terms that mean "includes, but is not limited to." The term "based on" is to be read as "based at least in part on." The term "one example implementation" is to be read as "at least one example implementation." The term "another implementation" is to be read as "at least one another implementation".

As stated above, the conventional disk drive typically has a form factor different from that of an input/output (I/O) card, and adopts different interface specification from that of the I/O card, which prevents the disk drive and the I/O card from operating cooperatively in a same storage device. Furthermore, in some implementations, it may be desired to insert fewer I/O cards and more disk drives for some storage devices, while it may be desired to insert more I/O cards, even only I/O cards, for some other storage devices. Conventionally, it is impossible to realize a flexible configuration between disk drives and I/O cards in the same storage device.

Figure 1A:
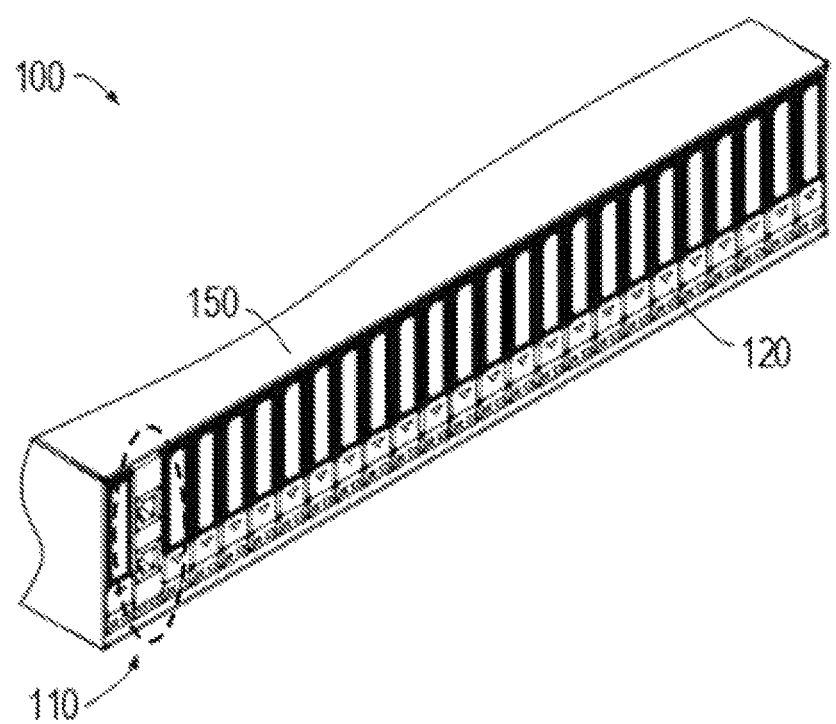
FIG. 1a and FIG. 1b illustrate a storage device inserted with disk drives and an I/O card having the same form factor as that of the disk drive according to the implementations of the subject matter described herein.
Figure 1B:
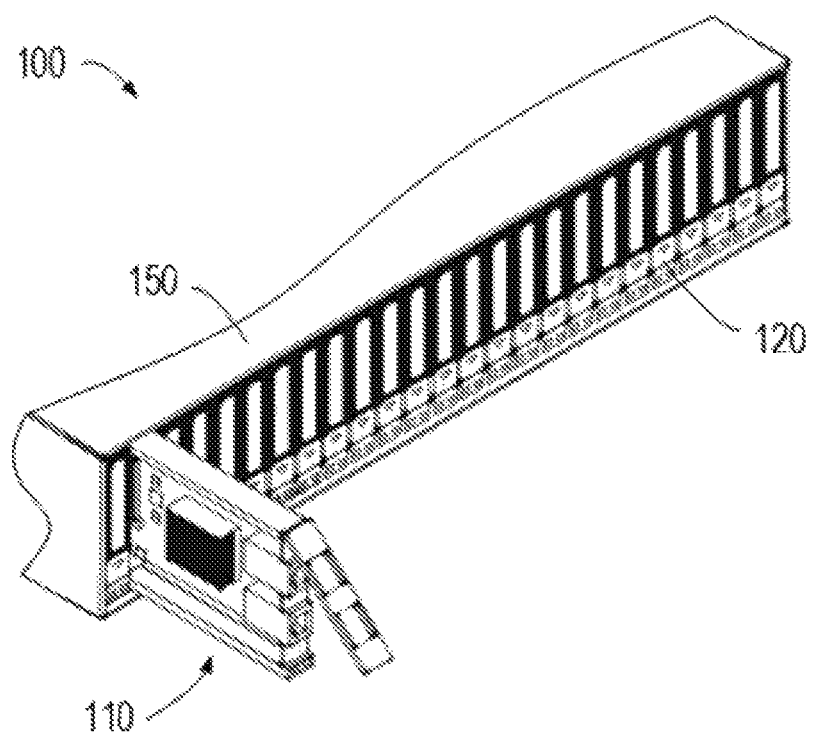

FIG. 1a and FIG. 1b illustrate a storage device 100 inserted with several disk drives 120 and one I/O card 110 having the same form factor as that of the disk drives 120 according to the implementations of the subject matter described herein. As shown in FIG. 1a and FIG. 1b, the I/O card 110 of the storage device 100 and the disk drive 120 for the storage device 100 have the same form factor and comply with the same protocol. In this manner, I/O card 110 and disk drive 120 can be arranged at the same end of the storage device 100 as shown in FIG. 1a and FIG. 1b, which facilitates user access (or hot plug) to the I/O card 110 and disk drive 120 at the same end, and thus enables cooperative operation between disk drive and I/O card in the same storage device. Additionally, the flexibility of rack cable routing in the storage device 100 can also be provided.

The disk drive 120 in FIG. 1a or FIG. 1b may be a general-purpose non-volatile storage device, for instance, a non-volatile solid-state storage device based on peripheral component interface express (PCIe) protocol. FIG. 1a illustrates the scenario in which the I/O card 110 is inserted in the rack 150 of the storage device 100. FIG. 1b illustrates the scenario in which the I/O card 110 is being plugged out of the rack 150 of the storage device 100 or the I/O card 110 is being inserted back to the rack 150. It is to be noted that, although FIG. 1a and FIG. 1b illustrate only one I/O card 110, the number of I/O cards 110 and the number of disk drives 120 can be configured flexibly according to actual requirements. For instance, more I/O cards 110 may be arranged in the rack 150, or the rack 150 can be inserted only with I/O cards 110. This is particularly advantageous for the storage device 100 that needs to be attached with external devices.

In some implementations, I/O card 110 may have a form factor of, for instance, 2.5 inches or 3.5 inches and thus can be matched with the currently widely used disk drive 120 having a size of 2.5 inches or 3.5 inches, and thereby maintaining a good backward compatibility. However, it should be appreciated that the subject matter described herein is not limited to the specific form factor of I/O card 110, and I/O card 110 having any other form factor also falls within the scope of the protection of the subject matter described herein.

Figure 2A:
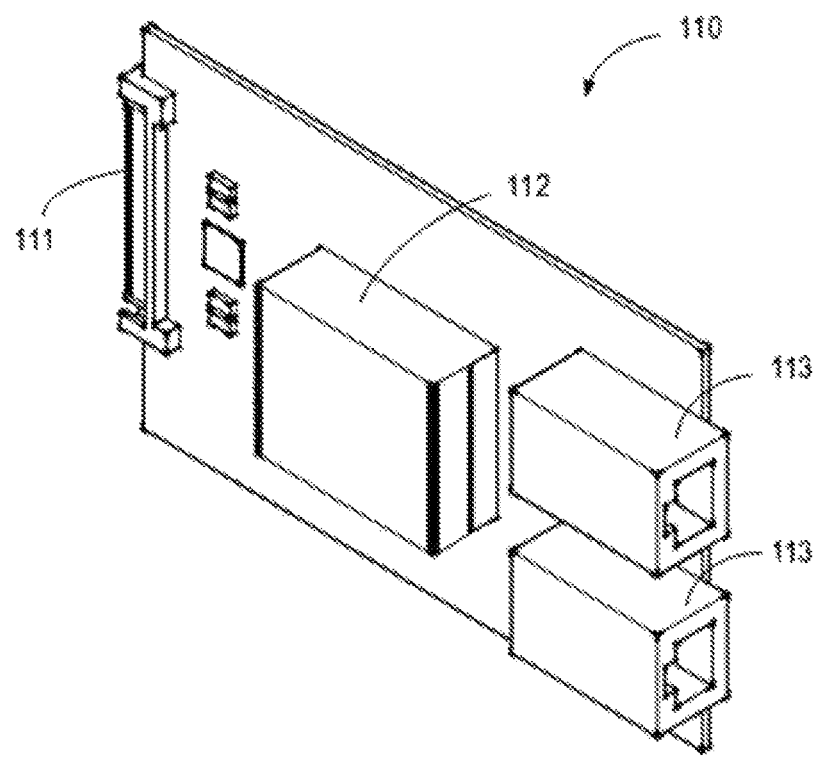
FIG. 2a illustrates an I/O card having the same form factor as that of the disk drive, according to the implementations of the subject matter described herein.
Figure 2B:
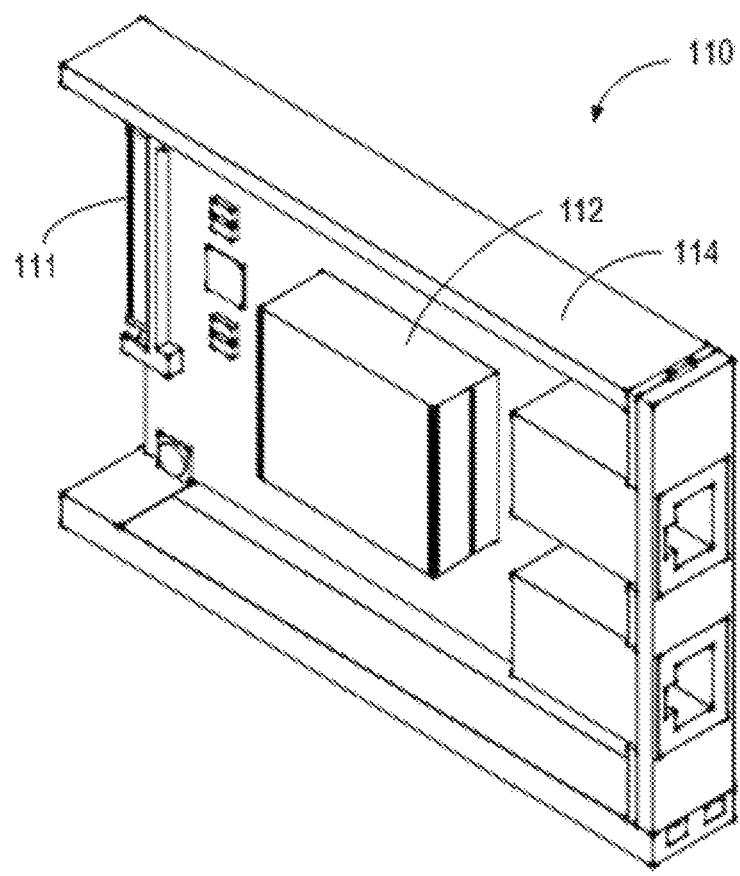
FIG. 2b illustrates an I/O card of FIG. 2a mounted onto a carrier.

FIG. 2a illustrates an I/O card 110 having the same form factor as that of the disk drive 120 according to the implementations of the subject matter described herein. FIG. 2b illustrates the scenario in which an I/O card 110 is mounted onto the carrier 114 as shown in FIG. 2a. Taking the Ethernet card with double ports shown in FIG. 2a or FIG. 2b as an example, the I/O card 110 includes a connector 111 which has the same form factor as that of a connector of disk drive 120 and complies with PCIe protocol. It is also to be noted that the PCIe protocol here is only an example protocol for connecting with a disk drive 120 which also complies with PCIe, for example, in a same switch. It will be discussed later with reference to FIG. 3b. Therefore, the subject matter described herein is not intended to limit the specific protocol or interface standard that I/O card 110 should comply with. It is to be understood by those skilled in the art that other protocols or interface standards, such as SAS and interface bus (IB), should all fall within the scope of protection of the subject matter described herein.

As shown in FIG. 2a, in this implementation, I/O card 110 may further have a controller 112 for controlling data transmission of I/O operation and a port 113 for connecting with external devices. The port 113 as shown in FIG. 2a is a commonly used type of ports for Ethernet card, which is only an example and does not intend to limit the scope of the subject matter described herein in any manner. Other types of ports 113 can also be used according to different types of external devices to be connected.

Figure 3A:
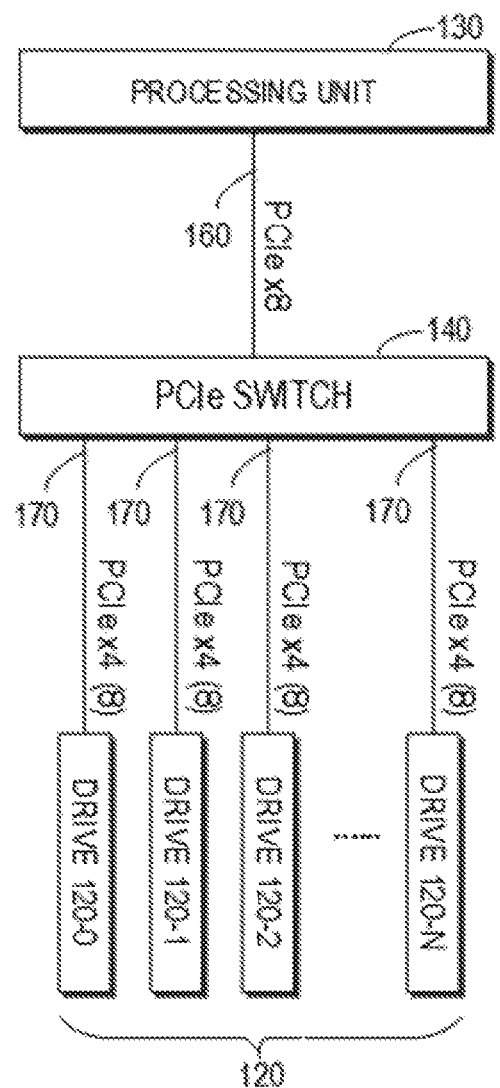
FIG. 3a illustrates a schematic system block diagram of a storage device connected only with disk drives.

FIG. 3a illustrates a schematic system block diagram of the storage device 100 connected only with disk drives. The storage device 100 shown in FIG. 3a includes a processing unit 130, a switch 140 connected to the processing unit 130 via a first bus 160, and multiple disk drives 120-0, 120-1, 120-2, 120-3, ..., 120-n (collectively referred to as "disk drive 120") connected to the port of the switch 140 via a second bus 170, where n is a natural number.

Figure 3B:
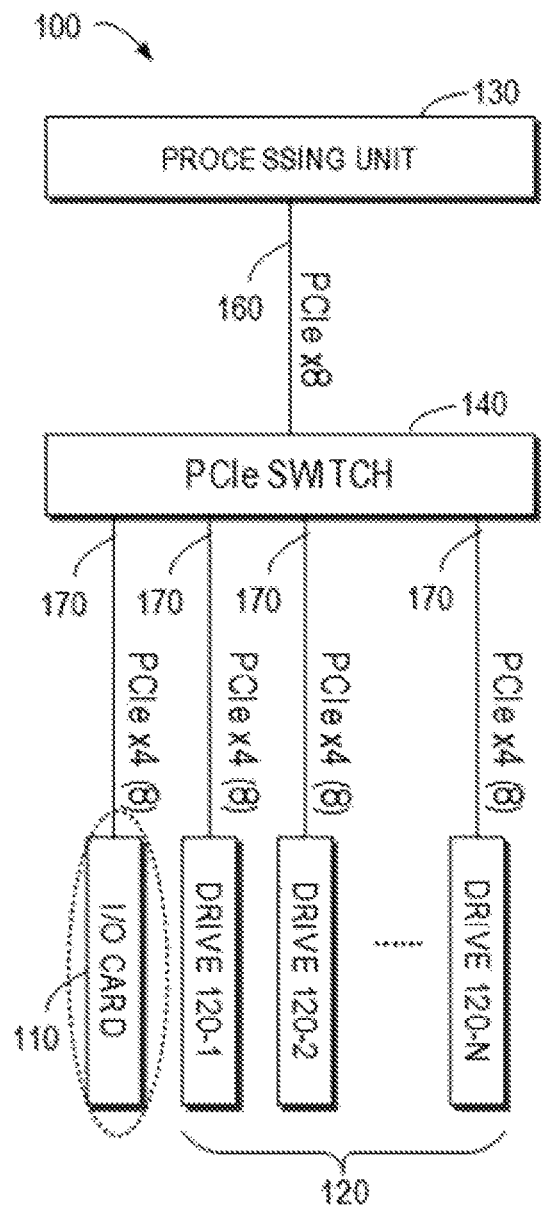
FIG. 3b illustrates a schematic system block diagram of a storage device connected with disk drives and one I/O card having the same form factor as that of the disk drive according to the implementations of the subject matter described herein.

FIG. 3b illustrates a schematic system block diagram of the storage device 100 connected with disk drives 120 and one I/O card 110 having the same form factor as that of the disk drive 120 according to the implementations of the subject matter described herein. Compared to the storage device 100 shown in FIG. 3a, the storage device 100 shown in FIG. 3b also includes the processing unit 130, the switch 140 connected to the processing unit 130 via the first bus 160, and the disk drives 120 connected to the ports in the switch 140 via the second bus 170 shown in FIG. 3a. The difference is that the storage device in FIG. 3b is further connected with a I/O card 110 as described above, which replaces the disk drive 120-0 as shown in FIG. 3a. As stated above, the I/O card 110 complies with the same protocol as that of the disk drive 120. In this way, the I/O card 110 can also be connected to the port in switch 140 via the second bus 170.

Furthermore, due to the fact that the I/O card 110 and the disk drive 120 have the same form factor, they can be arranged at the same end of the storage device 100. It is to be noted that, although I/O card 110 in FIG. 3b is arranged in place of disk drive 120-0, it can be understood that I/O card 110 can be arranged to replace any of other disk drives 120-1, 120-2, 120-3, ..., 120-n according to actual needs. Furthermore, as mentioned above, more I/O cards 110 and accordingly fewer disk drives 120 can be connected in the storage device 100 according to actual needs, thereby achieving fully flexible configuration between I/O card 110 and disk drive 120.

According to the implementations of the subject matter described herein, the same end that is arranged with both disk drive 120 and I/O card 110 is the front end of the storage device 100 that facilitates user access, which facilitates user's hot plug operation of I/O card 110 and disk drive 120. However, it is to be noted that arranging both the disk drive 120 and the I/O card 110 at the rear end of the storage device 100 are also possible. For instance, the local driver can be arranged at the rear end of the storage device 100 and function as a cache drive or a start drive of the operating system, while the disk drive 120 storing client data can be arranged at the front end of the storage system 100, which will facilitate the separation of local data from client data.

In some implementations, the switch 140 may include a PCIe switch. In these implementations, at least one of the first bus 160 and the second bus 170 is a PCIe bus. For example, in the implementations shown in FIG. 4a or FIG. 4b, both the first bus and the second bus are PCIe bus which has high data transmission rate and expandability. For instance, in an implementation, the first bus 160 can support a bidirectional transmission rate of 2000 MB/s, while each second bus 170 can support a bidirectional transmission rate of 1000 MB/s which can be expanded to 2000 MB/s. Furthermore, as PCIe-based non-volatile solid-state storage devices become more and more popular, it will be particularly advantageous to arrange I/O cards likewise based on PCIe bus in the same storage device 100.

Through the above description, it will be understood that various implementations of the subject matter described herein provide an input/output card for a storage device and a storage device. The I/O card and the disk drive for a storage device have the same form factor and comply with the same protocol so that the I/O card and the disk drive can be arranged at the same end of the storage device, thereby achieving flexible configuration of the I/O card and the disk drive at the same end in the same storage device.

Generally, while several specific implementation details are contained in the above discussions, these should not be construed as limitations on the scope of the subject matter described herein but as description of features only for specific implementation. Certain features that are described in this specification in the context of separate implementations can also be implemented in combination in a single implementation. Conversely, various features that are described in the context of a single implementation can also be implemented in multiple implementations separately or in any suitable sub-combination.

Though the subject matter described herein has been described with specific structural features, it is to be understood that the scope of the technical solution defined in the appended claims is not necessarily limited to the specific features described above. In other words, the present descriptions are only optional implementations. To those skilled in the art, implementations of the subject matter described herein may have various modifications and variations. Any modifications, equivalent replacements, and improvements within the spirit and principle of implementations of the subject matter described herein should be included within the protection scope of implementations of the subject matter described herein.

What is claimed is:

1. A storage system comprising:
   a rack, having an opening on a front side configured to receive a plurality of cartridges of a uniform size, all inserted in a single direction;
   a processing unit;
   a switch, wherein the switch is:
      connected to the processing unit via a first bus; and
      connected to a set of receiving connectors arranged along the front side of the rack via a second bus;
   a disk drive cartridge of the uniform size inserted into the front side of the rack in the single direction, the disk drive cartridge coupling to a first receiving connector of the set of receiving connectors via a first interface connector mounted on the disk drive cartridge according to a protocol of the second bus, the disk drive cartridge providing non-volatile storage; and
   an input/output (I/O) card cartridge of the uniform size inserted into the front side of the rack in the single direction, the I/O card cartridge coupling to a second receiving connector of the set of receiving connectors via a second interface connector mounted on the I/O card cartridge according to the protocol of the second bus, the second interface connector having a same format as the first interface connector, wherein the I/O card cartridge includes:
      a carrier; and
      an I/O card mounted on the carrier, the I/O card including:
         the second interface connector mounted at a first end of the I/O card proximal to the set of receiving connectors;
         a port, mounted at a second end of the I/O card distal to the set of receiving connectors, the port being configured to communicate with an external device; and
         a controller for controlling data transmission between the port and the second interface connector.

2. The storage system of claim 1, wherein the uniform size has a form factor of 2.5 inches or 3.5 inches.

3. The storage system according to claim 1, wherein the switch includes a peripheral component interface express (PCIe) switch, and wherein at least one of the first bus and the second bus is a PCIe bus.

* * * * *